US009557934B2

(12) United States Patent
Tuda

(10) Patent No.: US 9,557,934 B2
(45) Date of Patent: Jan. 31, 2017

(54) IC CARD, INFORMATION PROCESSING METHOD, COMPUTER READABLE RECORDING MEDIUM AND PROGRAM

(71) Applicant: Kabushiki Kaisha Toshiba, Tokyo (JP)

(72) Inventor: Yusuke Tuda, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 101 days.

(21) Appl. No.: 14/202,076

(22) Filed: Mar. 10, 2014

(65) Prior Publication Data

US 2015/0081972 A1    Mar. 19, 2015

(30) Foreign Application Priority Data

Sep. 18, 2013   (JP) ................................. 2013-193550

(51) Int. Cl.
  *G06F 12/00* (2006.01)
  *G06F 3/06* (2006.01)
  *G06Q 20/34* (2012.01)

(52) U.S. Cl.
  CPC ............. *G06F 3/0659* (2013.01); *G06F 3/068* (2013.01); *G06F 3/0622* (2013.01); *G06Q 20/354* (2013.01); *G06Q 20/355* (2013.01)

(58) Field of Classification Search
  CPC ... G06Q 20/354; G06Q 20/355; G06F 3/0622; G06F 3/0659; G06F 3/068
  See application file for complete search history.

(56) References Cited

U.S. PATENT DOCUMENTS

| 5,959,276 A | 9/1999 | Iijima | |
|---|---|---|---|
| 2002/0073293 A1* | 6/2002 | Mac.Smith | .......... G06Q 20/042 711/170 |
| 2008/0203157 A1 | 8/2008 | Thorsen et al. | |
| 2009/0235037 A1 | 9/2009 | Mounier et al. | |

FOREIGN PATENT DOCUMENTS

| EP | 0780813 A2 | 6/1997 |
|---|---|---|
| EP | 1260944 A2 | 11/2002 |
| EP | 1873728 A1 | 1/2008 |
| EP | 2228775 A2 | 9/2010 |
| JP | 3557181 B2 | 8/2004 |
| JP | 2006-243871 A | 9/2006 |
| JP | 2009230315 A | 10/2009 |

OTHER PUBLICATIONS

Office Action issued in related Singapore Patent Application No. 10201400488X mailed Dec. 2, 2014, 12 pages.

(Continued)

*Primary Examiner* — Larry Mackall
(74) *Attorney, Agent, or Firm* — Baker Botts L.L.P.

(57) ABSTRACT

An IC card is provided with an IC module. The IC module is provided with a memory section and a control section. The memory section stores information that shows a file structure. The control section receives a first command, transmits a first response containing the information showing the file structure in response to reception of the first command, receives a second command which is transmitted in response to the first response and which includes a first data searched from the information showing the file structure, and sets up the first data in response to reception of the second command.

3 Claims, 7 Drawing Sheets

(56) References Cited

OTHER PUBLICATIONS

ISO/IEC 7814-4 "Identification Cards—Integrated circuit cards—Part 4: Organization, security and commands for interchange" (Jan. 15, 2005), 90 pages.
Extended European Search report issued in related European Patent Application No. 14158532.3 Mailed Feb. 18, 2015, 7 pages.
EMV Card Personalization Specification, Version 1.1 (Jul. 2007), Table 20, p. 41. (Specification available at http://www.emvco.com/specifications.aspx?id=20).
Office Action issued in related Korean Patent Application No. 10-2014-24268 mailed May 22, 2015 (8 pages) with translation.
Office Action issued in related European Application No. 14158532.3 mailed Nov. 2, 2015 (5 pages).
Effing, Wolfgang, et al., Handbuch der Chipkarten, ISBN: 978-3-446-40402-1, Carl Hanser Verlag München, 2008 (25 pages).

\* cited by examiner

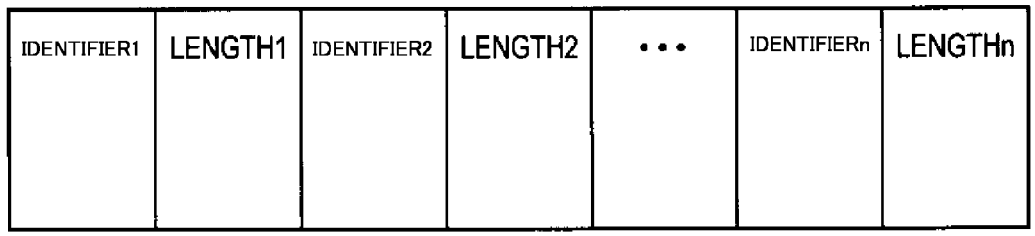
FIG. 8
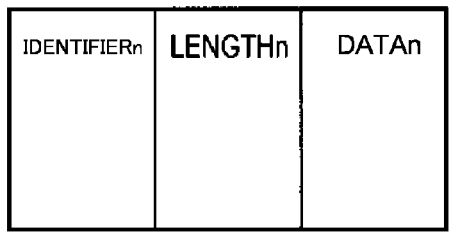
FIG. 9
| IDENTIFIER | EF CORRESPONDING TO IDENTIFIER | OFFSET FROM HEAD | SETTING COMPLETION FLAG |
|---|---|---|---|
| A | 1 | X1 | |
| B | 2 | X2 | |
| ⋮ | ⋮ | ⋮ | |
| N | N | Xn | |
FIG. 10

IC CARD, INFORMATION PROCESSING METHOD, COMPUTER READABLE RECORDING MEDIUM AND PROGRAM

CROSS-REFERENCE TO RELATED APPLICATION(S)

This application is based upon and claims the benefit of priority from the prior Japanese Patent Application No. 2013-193550, filed on Sep. 18, 2013, the entire contents of which are incorporated herein by reference.

FIELD

An embodiment of the invention relates to an IC card, an information processing method, a computer readable recording medium and a program.

BACKGROUND

In recent years, in every country in the world, the IC card has spread splendidly. The IC card is used in various fields as an ID card, such as an employee ID card, a membership card, an insurance card and so on, for example, in addition to a credit card, a commuter pass, a passport, a driver's license, and a settlement of other commercial transaction. The IC card includes an IC (integrated circuit) chip that has a nonvolatile data memory and a control element such as a CPU and the like.

The IC card is subjected to issue processing by an issuing device, and thereby the IC card becomes in an issue state.

As for the issuing device, its setting is changed for every product (IC card) from which file structure differs, and the issuing device performs different issue processing to those different products. That is, in an IC card issuing company that manages an issuing device, a work to change the setting for every product from which the file structure differs is required, and the work is a burden for the IC card issuing company. On the other hand, in an IC card manufacturing company that manufactures the IC cards, there arises a labor to prepare an issue manual etc. for every IC card from which the file structure differs. Moreover, the issue manual in a language of each country is needed because the IC card is issued in every country in the world.

BRIEF DESCRIPTION OF THE DRAWINGS

FIG. 8 shows an example of information that shows an internal structure of a file transmitted and received by the IC card system concerning the embodiment.

FIG. 9 shows an example of information that shows the internal structure of the file transmitted and received by the IC card system concerning the embodiment.

FIG. 10 shows an example of a table held by the IC card concerning the embodiment.

DETAILED EMBODIMENT

According to an embodiment, an IC card includes an IC module and a substrate in which the IC module is buried. The IC module includes a memory section and a control section. The memory section stores information showing a file structure. The control section receives a first command, transmits a first response containing information showing a file structure in response to reception of the first command, receives a second command which is transmitted in response to the first response and which includes a first data searched from the information showing the file structure, and set up the first to the IC module itself in response to reception of the second data command. The IC card having the above-mentioned structure, can simplify issue processing.

Hereinafter, an embodiment is explained with reference to the drawings.

Figure 1:
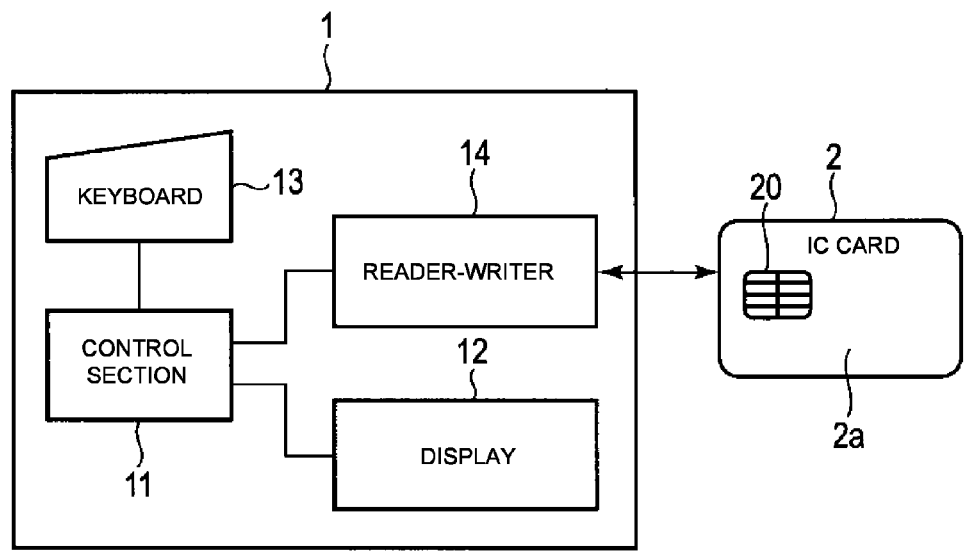
FIG. 1 is a block diagram showing a schematic structure of an IC card system (in an another name, a smart card system) concerning an embodiment.

FIG. 1 is a block diagram showing a schematic structure of an IC card system concerning the embodiment. As shown in FIG. 1, the IC card system includes a terminal 1 (issuing device) and an IC card 2 (portable electronic device). The terminal 1 includes a control section 11, a display 12, a keyboard 13, and a reader-writer 14. The terminal is capable of communicating with the IC card 2, and the terminal 1 transmits data to the IC card 2, and receives data from the IC card 2. The terminal 1 transmits an issue command to the IC card 2, performs issue processing to the IC card, and makes the IC card be in an issue state, for example.

The control section 11 is capable of performing a plurality of applications alternatively. The display 12 displays a result of communication with the IC card 2, a result of authentication with the IC card 2, etc. The keyboard 13 inputs a character, a number, etc. to the control section 11. The reader-writer communicates with the IC card 2.

In addition, the IC card 2 may be any of a contact type card, a noncontact type card (wireless card), and a combination type card that supports both the noncontact type and the contact type.

Figure 2:
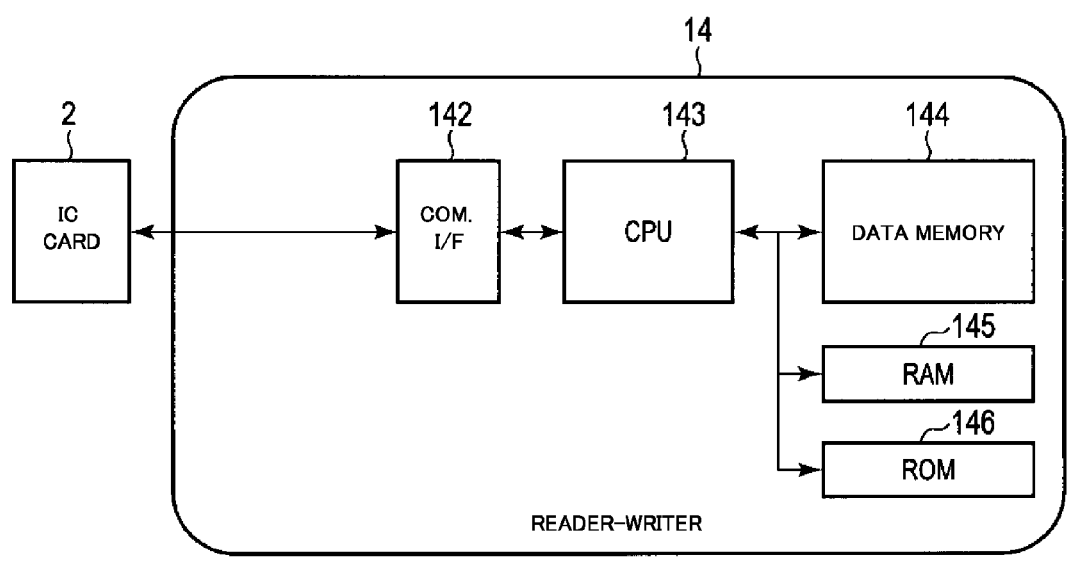
FIG. 2 is a block diagram showing a schematic structure of a reader-writer concerning the embodiment.

FIG. 2 is a block diagram showing a schematic structure of the reader-writer concerning the embodiment. As shown in FIG. 2, the reader-writer 14 includes a communication I/F 142, a CPU 143, a data memory (nonvolatile memory) 144, an RAM 145, and an ROM 146. The CPU 143 controls transmission of a command etc. to the IC card 2, detects a response from the IC card 2, and further controls transmission of a command etc. to the IC card 2 based on the response from IC card 2.

Figure 3:
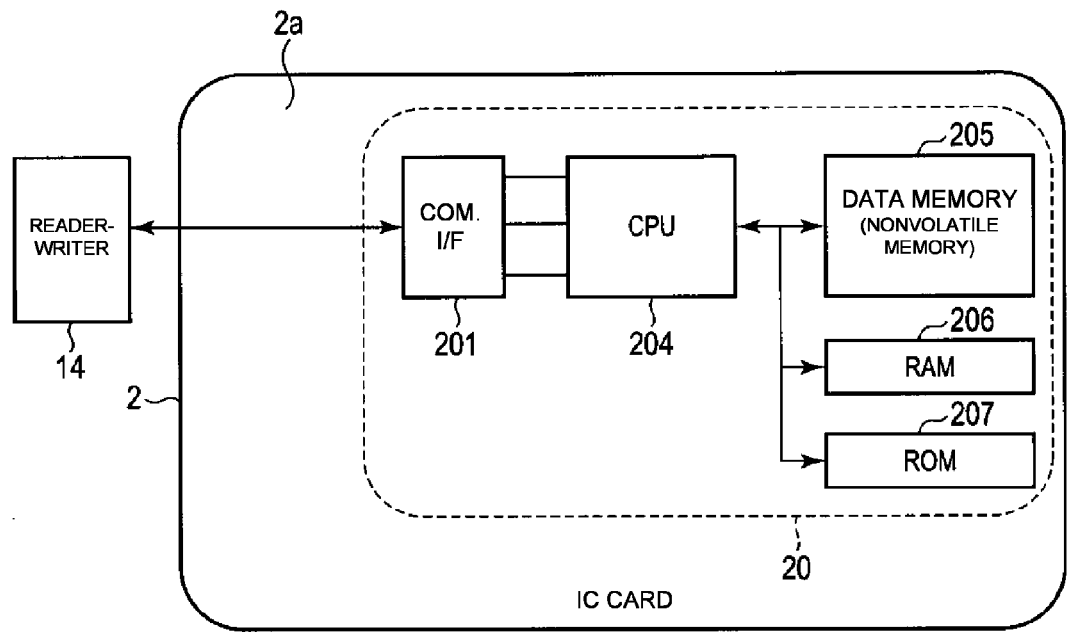
FIG. 3 is a block diagram showing a schematic structure of an IC card concerning the embodiment.

FIG. 3 is a block diagram showing a schematic structure of the IC card concerning the embodiment. As shown in FIG.

3, the IC card 2 includes a plastic card (substrate) 2a and an IC module (IC chip) 20, for example. The IC module 20 has a communication I/F 201, a CPU 204, a data memory (nonvolatile memory, such as EEPROM, FRAM, FLASH) 205, an RAM 206, and an ROM 207. In addition, although the IC card 2 described above is explained as an example of a portable electronic device, the embodiment is not limited to this. The portable electronic device may be an SIM-shaped IC card, for example.

The RAM 206 performs as a working memory. The ROM 207 holds IC card programs executed by the CPU 204. The CPU 204 operates based on the IC card programs etc. that are stored in the ROM 207. Moreover, the CPU 204 reads data stored in the data memory 205 or the RAM 206, and writes data to the data memory 205 or the RAM 206. Furthermore, the CPU 204 interprets and executes the command (the command transmitted from the terminal 1) received via the communication I/F 201, and controls reply of a command execution result to the terminal 1 via the communication I/F 201.

The data memory 205 stores a Main File (which is abbreviated as a MF), a plurality of Dedicated Files (which are abbreviated as DFs) belong to the MF, and an Elementary File (which is abbreviated as an EF) belong to each Dedicated File, for example. The MF is a DF located in the top level, one or more of DFs belong to the MF, and one or more of EFs belong to each DF. One or more data objects are stored in these MF, DF and EF. The data object is structured by kind information (tag value) that shows classification of a value field, data length information (length) that shows a data length of the value field, and the value field (value).

Next, an outline of issue processing is explained.

The CPU 204 etc. of the IC card 2 performs the issue processing (transmission of a response and change for the present state of the IC card 2 from an issue state to an issue completion state) explained by this embodiment. Moreover, the control section 11, the reader-writer 14, etc. of the terminal 1 perform the issue processing (transmission of a command, a search of data, etc.) explained by this embodiment.

In the issue processing, the reader-writer 14 of the terminal 1 transmits an issue command (an identifier=0xFFFF is included, for example) to the IC card 2. The issue command is a command used in order to set personal information and data for internal control to the IC card. The IC card 2 has a mechanism that replies a response data when it receives the issue command and detects the identifier=0xFFFF. This response data is data that controls the terminal 1. Moreover, this response data includes information that shows the file structure of the IC card 2, for example. Upon receiving the response data, the terminal 1 performs the issue processing based on the information that shows the file structure of the IC card 2. That is, the terminal 1 performs the issue processing based on a setting according to the file structure of the IC card 2. Thereby, the terminal 1 can issue an IC card according to the file structure for every product (IC card) easily.

Here, issuing shall be completed by setting data required for the issue, such as the personal information, the data for internal control, etc. to the IC card 2.

Figure 4:
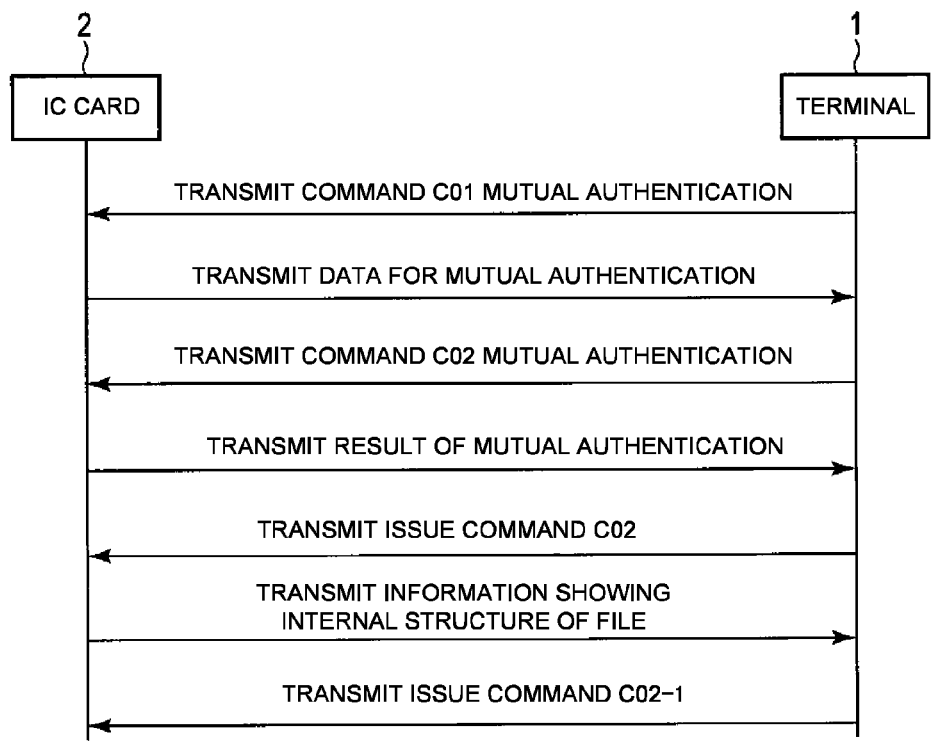
FIG. 4 is a flow chart that summarized transmission and reception of the command between a terminal and an IC card, about mutual authentication and the first half of issue processing in the IC card system concerning the embodiment.
Figure 5:
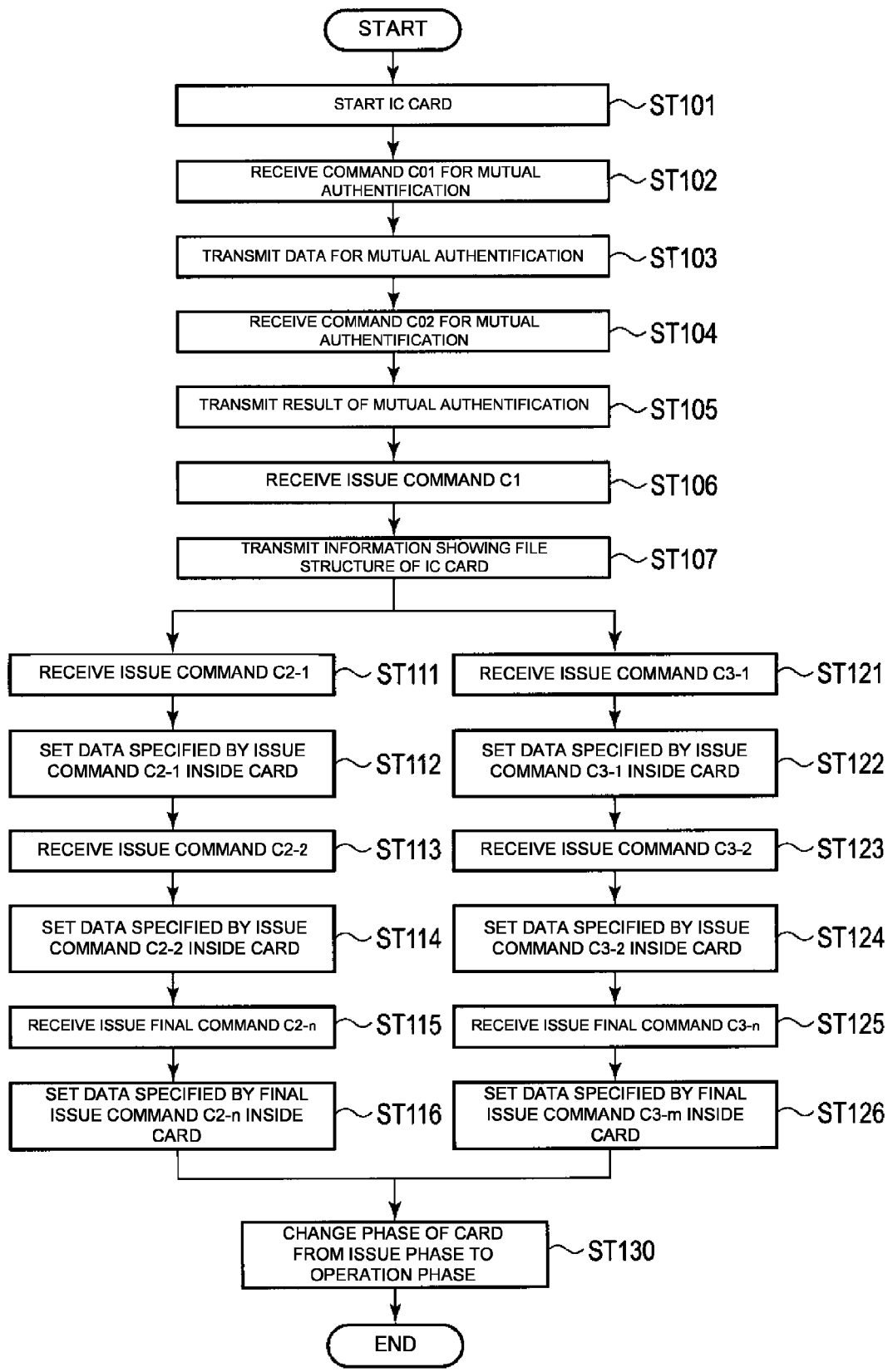
FIG. 5 is a flow chart that summarized the mutual authentication and the issue processing in the IC card system concerning the embodiment focusing on the IC card.

FIG. 4 is a flow chart that summarized transmission and reception of the command between the terminal 1 and the IC card 2, about mutual authentication and the first half of issue processing. FIG. 5 is a flow chart summarized focusing on the IC card 2 about mutual authentication and issue processing.

As shown in FIG. 4 and FIG. 5, the IC card 2 and the terminal 1 exchange information by the command and the response. First, the IC card 2 starts (ST101). The terminal 1 transmits a command C01 for mutual authentication to the IC card 2, and the IC card 2 receives the command C01 for mutual authentication (ST102) and transmits data for mutual authentication to the terminal 1 (ST103), for example. The terminal 1 transmits a command C02 for mutual authentication to the IC card 2 in response to this, and the IC card 2 receives the command C02 for mutual authentication (ST104) and transmits a mutual authentication result to the terminal 1 (ST105). The terminal 1 transmits an issue command C1 to the IC card 2 in response to this, and the IC card 2 receives the issue command C1 (ST106) and transmits information that shows file structure of the IC card to the terminal 1 (ST107).

As mentioned above, the IC card 2 and the terminal 1 check mutual justification with the command C01 for mutual authentication, and the command C02 for mutual authentication. This method uses a generally known method like EMV Card Personalization Specification v.1.1 2007 (a common issue specification of a credit industry standard), for example. Then, when the terminal 1 transmits the issue command C1 to the IC card 2, the IC card 2 transmits the information that shows the file structure to the terminal 11.

The information showing the file structure may be data (shown in FIG. 8, for example) in which Tags (identification information, abbreviated as "T") and Lengths (length, abbreviated as "L") of a series of data set up later are gathered, or may be a Tag of data set up next, for example. The terminal 1 changes a system of data that is transmitted after this according to the information that shows this file structure.

According to the information that shows the file structure, the terminal 1 issues an issue command C2-1, and the IC card 2 receives the issue command C2-1 (ST111) and sets data specified by the issue command C2-1 inside the IC card (ST112), for example. Then, the terminal 1 issues an issue command C2-2, and the IC card 2 receives the issue command C2-2 (ST113) and sets data specified by the issue command C2-2 inside the IC card (ST114). Finally, the terminal 1 issues a final issue command C2-n, and the IC card 2 receives the issue command C2-n (ST115), sets data specified by the issue command C2-n inside the card (ST116), and changes a phase into an operation phase (issue completion state) from an issue phase (issue state) (ST130). Thereby, the IC card 2 sets a plurality of data inside the card.

Or, according to the information (a second information) that shows the file structure, the terminal 1 issues a issue command C3-1, and the IC card 2 receives the issue command C3-1 (ST121) and sets data specified by the issue command C3-1 inside the IC card (ST122). Then, the terminal 1 issues an issue command C3-2, and the IC card 2 receives the issue command C3-2 (ST123) and sets data specified by the issue command C3-2 inside the IC card (ST124). Finally, the terminal 1 issues a final issue command C3-n, and the IC card 2 receives the issue command C3-n (ST125), sets data specified by the issue command C3-n inside the card (ST126), and changes a phase into the operation phase (issue completion state) from an issue phase (issue state) (ST130). Thereby, the IC card 2 sets a plurality of data inside the card.

Thereby, the terminal 1 can set up the data to the product (IC card) according to the file structure for every product (IC card) by setting (storing) the information that shows the file structure to the IC card beforehand. The above explanation shows an example in which the data are set to two kinds of products.

The A Company sets up the information that shows the file structure to the IC card 2, and ships the IC card 2 to the B Company that manages and operates the terminal 1, for example. The B Company performs the issue processing to the received IC card 2 by the terminal 1. When the terminal 1 transmits the issue command to the IC card 2, the terminal 1 can receive the information that shows the file structure from the IC card 2. The terminal 1 can set up the data corresponding to the IC card 2 to the terminal 1 itself by checking the file structure automatically based on this information. Thereby, it becomes unnecessary to perform an original setting to the terminal 1 side for every product (the IC card 2) from which the file structure differs. In addition, the control section 11 of the terminal 1 can analyze the information that shows the file structure transmitted from the IC card 2.

Figure 6:
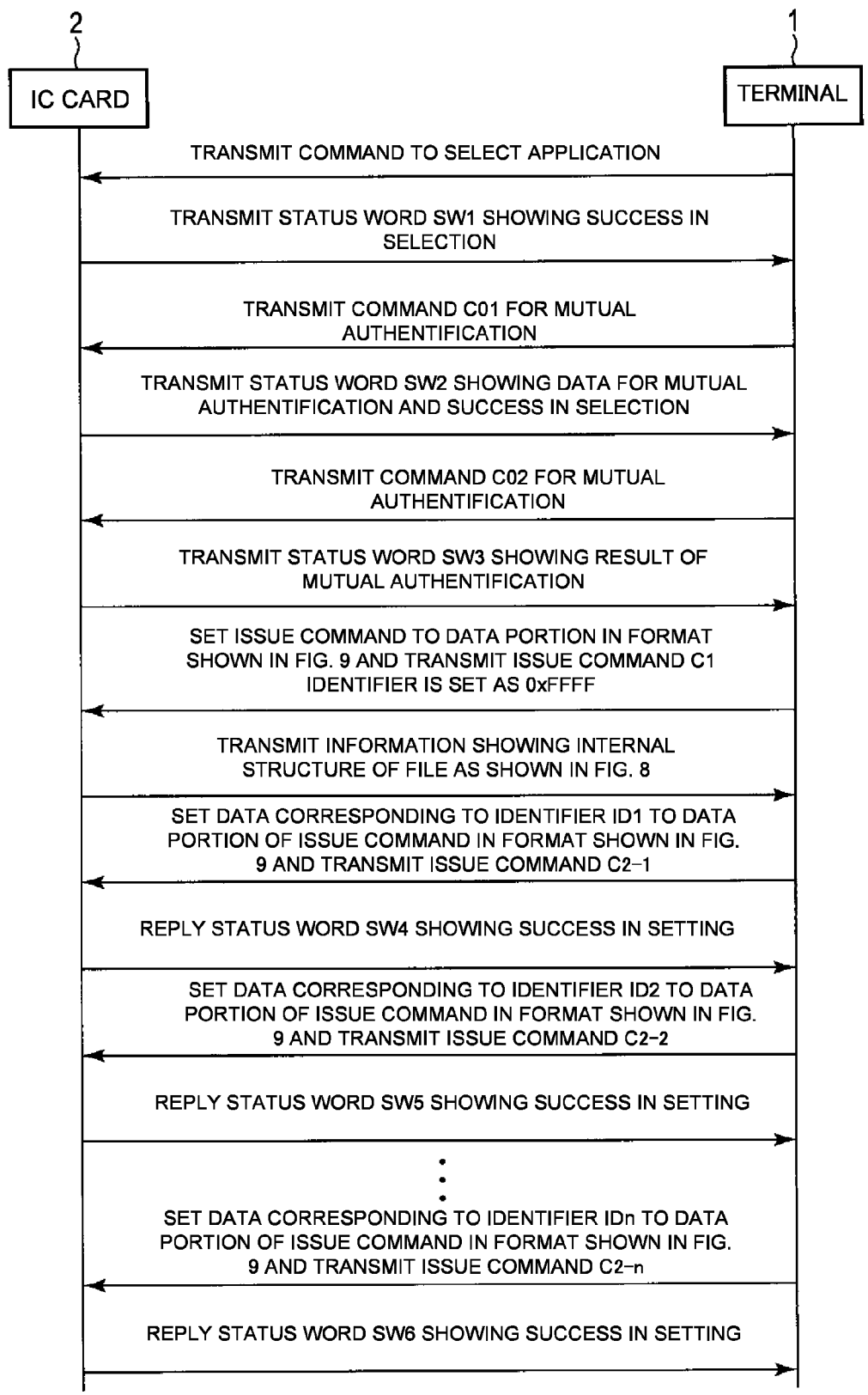
FIG. 6 is a flow chart that summarized transmission and reception of the information between the terminal and the IC card, about the mutual authentication and the issue processing in the IC card system concerning the embodiment.
Figure 7:
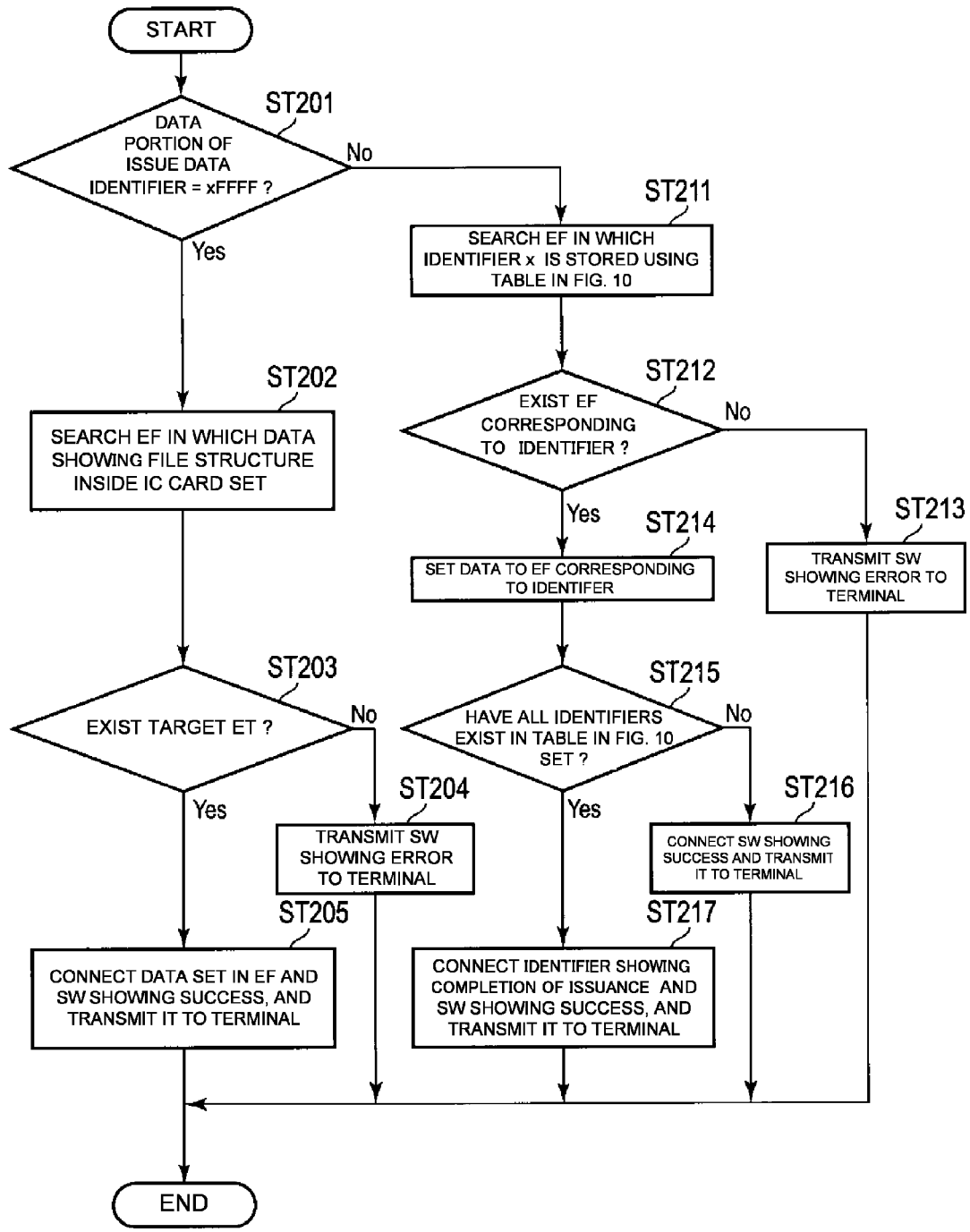
FIG. 7 is a flow chart that summarized processing of the IC card about issue processing including the identification processing etc. of an issue command in the IC card system concerning the embodiment.

Next, with reference to FIG. 6 and FIG. 7, the above-mentioned issue processing is explained in more detail.

The terminal 1 transmits a command that chooses application to the IC card 2, and when the IC card 2 succeeds in selection of the application, the IC card 2 replies to the terminal 1 a status word SW1 that shows the success in selection. In response to this, the terminal 1 transmits the command C01 for mutual authentication to the IC card 2, and the IC card 2 transmits data for mutual authentication and a status word SW2 that shows the success in mutual authentication to the terminal 1. In response to this, the terminal 1 transmits the command C02 for mutual authentication to the IC card 2, and the IC card 2 transmits a status word SW3 that shows a result of mutual authentication to the terminal 1.

The terminal 1 sets data to a data portion of the issue command in a format shown in FIG. 9, and transmits the issue command C1 (for example, an identifier=0xFFFF is included) to the IC card 2, for example. The IC card 2 receives the issue command C1, and transmits a response including the information that shows the internal structure of the file shown in FIG. 8 to the terminal 1.

The terminal 1 sets data corresponding to an identifier ID1 to the data portion of the issue command C2-1 in a format shown in FIG. 9, and transmits the issue command C2-1 to the IC card 2. The IC card 2 receives the issue command C2-1, and replies a status word SW4 that shows the success in setting to the terminal 1.

The terminal 1 sets data corresponding to an identifier ID2 to the data portion of the issue command C2-2 in the format shown in FIG. 9, and transmits the issue command C2-2 to the IC card 2. The IC card 2 receives the issue command C2-2, and replies a status word SW5 that shows the success in setting to the terminal 1.

Repeating the above, the terminal 1 sets data corresponding to an identifier IDN to the data portion of an issue command C2-n in the format shown in FIG. 9, and transmits the issue command C2-n to the IC card 2. The IC card 2 receives the issue command C2-n, and replies a status word SW6 that shows the success in setting to the terminal 1.

The information showing the file structure inside the IC card may be data (shown in FIG. 8, for example) in which the identifiers and the lengths of data corresponding to the identifiers of a series of data set up later are connected, or may be an identifier and a length of data corresponding to the identifier of data set up next (shown in FIG. 9, for example), for example.

The case where the data in which the identifiers and the lengths of data corresponding to the identifiers of a series of data are connected, as shown in FIG. 8, is replied to the terminal 1 is explained.

The terminal 1 sets data to the data portion of the issue command C1 in the format shown in FIG. 9, and transmits the issue command C1 to the IC card 2. In that case, an identifier that is set to the data portion is 0xFFFF, for example. As shown in FIG. 7, the IC card 2 confirms that the identifier of the data portion of the issue command is 0xFFFF (ST201, YES), and then the IC card 2 searches an EF in which the data showing the internal file structure of the IC card 2 is set (ST202). When an target EF exists (ST203, YES), the IC card 2 connects data in the format shown in FIG. 8 set to the EF and a status word SW which shows the success, and transmits the connected data to the terminal 1 (ST205).

After this, the terminal 1 transmits an issue command according to the data of the internal file structure of the IC card 2 shown in this FIG. 8. The terminal 1 sets data corresponding to an identifier 1 to the data portion of the issue command in the format shown in FIG. 9, and transmits the issue command. As shown in FIG. 7, the IC card 2 searches an EF corresponding to this identifier and an offset from the head of the EF according to FIG. 10 (ST211), and sets data corresponding to the identifier 1 to the EF corresponding to the identifier 1 (ST212, YES), (ST214).

Moreover, next, the terminal 1 sets data corresponding to an identifier 2 to the data portion of the issue command in the format shown in FIG. 9, and transmits the issue command. The IC card 2 searches an EF corresponding to this identifier and an offset from the head of the EF according to FIG. 10 (ST211), and sets data corresponding to the identifier 2 to the EF corresponding to the identifier 2 (ST212, YES), (ST214).

After this, the terminal 1 and the IC card 2 repeat and perform the above-mentioned processing, and eventually set data corresponding to the identifier n to an offset specified of the EF corresponding to the identifier n.

At this time, the IC card 2 checks whether all the identifiers that exist in FIG. 10 have been set up as shown in FIG. 7 (ST215). When all identifiers are set up (ST215, YES), the IC card 2 connects the identifier that shows that issue is completed and the status word SW that shows the success, and transmits the connected data to the terminal (ST217).

When the terminal 1 receives the identifier showing that issue is completed, the terminal 1 transmits the issue command showing that a command is a final issue command to the IC card 2, in order to complete the issue.

When the IC card 2 receives the issue command showing that the command is the final issue command, the IC card 2 changes (updates) the application into the issue completion state from the issue state, and after this the IC card 2 shifts to a state of replying an error SW when receiving the issue command.

Thus, there is provided a system in which the IC card 2 replies a response data to the issue command used in order to set up the personal information or the data for internal control to the IC card 2, and in which the terminal 1 (an issuing machine) changes the processing according to the response data.

By this means, in the IC card system, the issue corresponding to the file structure inside the IC card for every product (the IC card 2) is attained, and discrimination of two or more products is attained and the issue process of the IC card can be increased in efficiency.

Figures 11, 12:
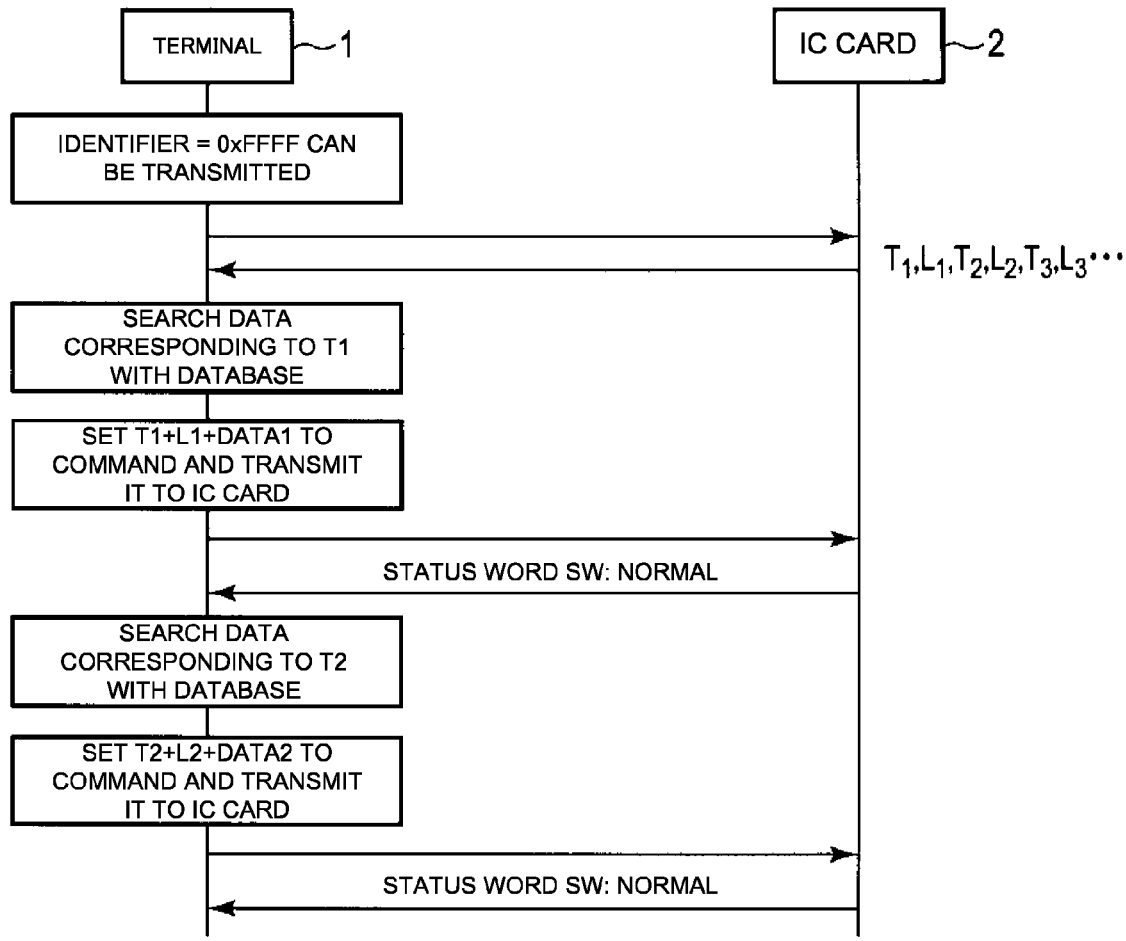
FIG. 11 is a flow chart summarized focusing on processing corresponding to a response of the terminal in the IC card system concerning the embodiment.
FIG. 12 shows an example of a database referred to by the terminal in the IC card system concerning the embodiment.

FIG. 11 is a flow chart summarized focusing on processing corresponding to a response in the terminal side in the IC card system concerning the embodiment.

As explained above, the terminal 1 sets the data to a data portion of the issue command in a format shown in FIG. 9, and transmits the issue command C1 (for example, an identifier=0xFFFF is included) to the IC card 2. The IC card 2 receives the issue command C1, and transmits a response including information (T1, L1, T2, L2, T3, L3 . . . , for example) which shows the internal structure of the file shown in FIG. 8 to the terminal 1.

The terminal 1 receives the response including the information (T1, L1, T2, L2, T3, L3 . . . , for example) which shows the internal structure of the file, and searches data corresponding to T1 (identification information) with reference to a database of the terminal 1 side shown in FIG. 12 based on the information that shows the internal structure of the file, and transmits the issue command containing T1, L1 and Data1 to the IC card 2. The IC card 2 receives the issue command containing T1, L1 and Data1, sets Data1 contained in the issue command to a predetermined EF with reference to the table shown in FIG. 10 based on T1 contained in the issue command, and replies the status word SW that shows normality. Similarly, the terminal 1 searches data corresponding to T2 with reference to the database of the terminal 1 side shown in FIG. 9 based on the information which shows the internal structure of the file, and transmits the issue command containing T2, L2 and Data 2 to the IC card 2. The IC card 2 receives the issue command containing T2, L2 and Data2, sets Data2 contained in the issue command to a predetermined EF with reference to the table shown in FIG. 10 based on T2 contained in the issue command, and replies the status word SW that shows normality.

In addition, the above-mentioned processing (the issue processing) is realizable by performing software. Accordingly, a program that performs the procedure of the above-mentioned processing and the database shown in FIG. 12 are stored in a computer readable recording medium. Then, this program is installed to a usual computer through this recording medium. The computer executes this program and thereby the above-mentioned processing is realized.

The terminal 1 downloads the above-mentioned program (and the database), stores the downloaded program, and thereby can complete installation of the program, for example. Thereby, the terminal 1 equivalent to the above-mentioned computer can realize the above-mentioned processing easily based on the installed above-mentioned program.

Moreover, the terminal 1 can read the above-mentioned program from the computer readable recoding medium, can store the read program, and can complete installation of the program.

Hereinafter, the embodiment is summarized.

1) The IC card of the embodiment is an IC card that can execute a command instructed from the outside. The IC card of the embodiment can reply the data by which the file structure inside the IC card can be identified, in response to a received command, as the response data.

2) The data by which the file structure inside the IC card can be identified is the data in which a plurality of identifiers and lengths of data corresponding to the identifiers for a series of data are connected.

3) The data by which the file structure inside the IC card can be identified is an identifier of data that is set up immediately behind a length and the length of data corresponding to the identifier.

4) When the IC card receives an issue command for setting up the personal information and the data for internal control of the IC card, the IC card checks that data that needs setting up has been issued, and can reply a special identifier showing the result as a response data.

5) In order to reply the data by which the file structure inside the IC card can be identified as the response data, a command that the IC card receives is the issue command for identifying the personal information and the data for the internal control of the IC card.

6) The terminal of the embodiment is a terminal that can execute the command instructed from the outside. When the terminal receives the data by which the file structure inside the IC card can be identified as the response data, the terminal can analyze the data, can set the personal information and the data for the internal control of the IC card which correspond the data to the data portion of the issue command for setting them up, and can transmit the issue command to the IC card As mentioned above, the embodiment has following effective advantage.

The IC card used for a credit card covers various kinds of IC cards from a high performance product to a low performance product (some function of cipher is not supported, for example), and there is a plurality of products.

According to the embodiment, the issue data which is needed for each product (the IC card 2) can be identified at a issue machine (the terminal 2) side. Since the issue machine can identify a plurality of products, the issue machine can increase the efficiency of the issue process of the IC card.

While an embodiment has been described, the embodiment has been presented by way of example only, and is not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such a form or modifications as would fall within the scope and spirit of the inventions.

What is claimed is:

1. An IC card, comprising:
an IC module; and
a substrate in which the IC module is buried;
wherein the IC module includes
a memory to store information showing a file structure, wherein the information includes identifiers of a series of data to be set up; and
a controller to
receive a first command,
transmit a first response containing the information showing the file structure in response to reception of the first command,
receive a second command which is transmitted in response to the first response, and which includes first data corresponding to a first identifier in the information showing the file structure, and
set up the first data to the IC module itself in response to reception of the second command;
wherein the controller
transmits the first response containing the information showing the file structure which contains a first set of data including the first identifier and a first length, and a second set of data including a second identifier and a second length,
receives a second command containing the first identifier and the first data corresponding to the first identifier, and receives a third command containing the second identifier and second data corresponding to the second identifier.

2. The IC card according to claim 1, wherein the controller
sets up, to the IC module, the first data contained in the second command corresponding to the first identifier, and
sets up, to the IC module, the second data contained in the third command corresponding to the second identifier.

3. The IC card according to claim 2, wherein the controller sets up the second data to the IC module and changes a present state into an issue completion state.

\* \* \* \* \*